United States Patent [19]

Yamakawa

[11] Patent Number: 4,530,575
[45] Date of Patent: Jul. 23, 1985

[54] VIDEO PROJECTOR LENS SYSTEM
[75] Inventor: Kazuo Yamakawa, Sakai, Japan
[73] Assignee: Minolta Camera Kabushiki Kaisha, Osaka, Japan
[21] Appl. No.: 463,634
[22] Filed: Feb. 3, 1983
[30] Foreign Application Priority Data Feb. 12, 1982 [JP] Japan ................... 57-21736

[51] Int. Cl.³ .................. G02B 9/34; G02B 13/18
[52] U.S. Cl. .................. 350/432; 350/412; 350/469
[58] Field of Search .............. 350/412, 432, 469

[56] References Cited

U.S. PATENT DOCUMENTS

| 3,429,997 | 2/1969 | Rosner et al. | 350/438 X |
| 3,516,734 | 6/1970 | Schmidt | 350/465 |
| 3,800,085 | 3/1974 | Ambats et al. | 350/412 X |
| 3,868,173 | 2/1976 | Miles et al. | 350/432 X |
| 3,961,844 | 6/1976 | Betensky | 350/412 |
| 4,348,081 | 9/1982 | Betensky | 350/412 |

FOREIGN PATENT DOCUMENTS 56-78815 6/1981 Japan .

Primary Examiner—John K. Corbin
Assistant Examiner—Scott J. Sugarman
Attorney, Agent, or Firm—Joseph W. Price

[57] ABSTRACT

A video projector lens system is provided, which comprises first positive lens, second positive lens, third negative lens, fourth positive lens and fifth negative lens. The third negative lens is made of plastic and located for correcting chromatic aberration, while the first or second positive lens is made of plastic for cancelling the temperature depending characteristic of the second negative plastic lens with its counterbalanced positive refractive power, wherein at least one aspheric surface is made on the plastic lens. The fourth positive lens bearing a considerable part of the positive refractive power distributed in the whole lens system is made of glass for avoiding further temperature dependency.

21 Claims, 9 Drawing Figures

Spherical Aberration

Astigmatism

Spherical Aberration

Astigmatism

Spherical Aberration

Astigmatism

VIDEO PROJECTOR LENS SYSTEM

BACKGROUND OF THE INVENTION

1. Field of the Invention

The present invention relates to a lens system for a video projector, and more particularly to a refractive lens system located in front of the cathode ray tube for projecting onto a screen a video image formed on a face plate of the cathode ray tube.

2. Description of the Prior Art

In designing a lens system for a video projector of a three-tube type, the correction of chromatic aberration can be generally left out of consideration, since three identical video projector lens systems are located in front of three cathode ray tubes each forming decomposed three different monochromatic images, respectively, to project them toward a screen for composing one complete color image thereon, and each projector lens system is requested to transmit only such a monochromatic image. Strictly speaking, however, the monochromatic image is practically formed by light of a plurality of different wavelengths within a narrow wavelength band, the width of the band depending on the spectral characteristic of fluorescent material of individual cathode ray tubes. Especially, the images formed by the cathode ray tubes in charge of green image and blue image, respectively, are rather inadequate to be each regarded as a monochromic image. Therefore, in a high definition video projector such as CRT for displaying characters utilized as a terminal of a computer, the chromatic aberration of the video projector lens system due to the considerable width of band of wavelengths forming the "monochromatic image" is not negligible.

On the other hand, the video projector lens system generally utilize plastic lens elements for forming aspheric surfaces thereon. A plastic lens element, however, generally shows a greater degree of variation in refractive index depending on the change in temperature, in comparison with a glass lens element. In the above mentioned high definition video projector, such a temperature dependent characteristic also causes an unneglible problem.

Various video projector lens systems have been described in Patents or Patent Applications, such as U.S. Pat. Nos. 3,800,085 and 4,348,081, Copending U.S. patent application Ser. No. 347,032 and Japanese Patent Application Laid Open No. 56-78815.

SUMMARY OF THE INVENTION

An object of the present invention is to solve the above mentioned problems and provide an improved lens system for a high definition video projector.

Another object of the present invention is to provide a high performance video projector lens system capable of optically transmitting a high definition video image.

Still another object of the present invention is to provide such a video projector lens system with a high speed.

The present invention provides a video projector lens system comprising, from the screen to the tube side a first positive lens, a second positive lens, a third negative lens, a fourth positive lens and a fifth negative lens; at least the fourth lens being made of glass, wherein the lens system includes at least one aspheric surface.

The features of the present invention, which are believed to be novel, are set forth with particularity in the appended claims. The present invention, both as to its organization and manner of operation, together with further objects and advantages thereof, may be best understood by reference to the following description, taken in conjunction with the accompanying drawings.

DETAILED DESCRIPTION OF THE PREFERRED EMBODIMENTS

The following specification, taken in conjunction with the drawings, sets forth the preferred embodiments of the present invention. The embodiments of the invention disclosed herein are the best modes contemplated by the inventor for carrying out his invention in the commercial optical video field, although it should be understood that various modifications can be accomplished within the parameters of the present invention.

Figure 1:
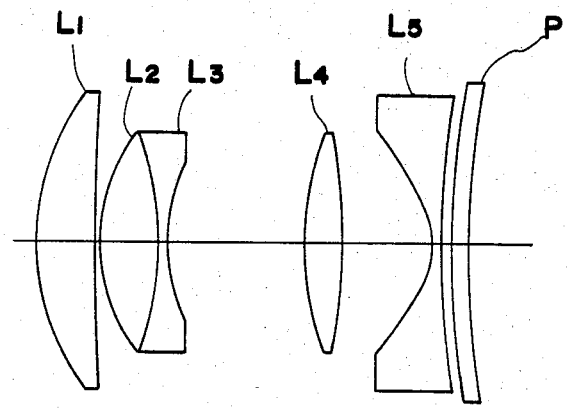
FIG. 1 represents a schematic cross sectional view of a first embodiment according to the present invention.
Figure 3:
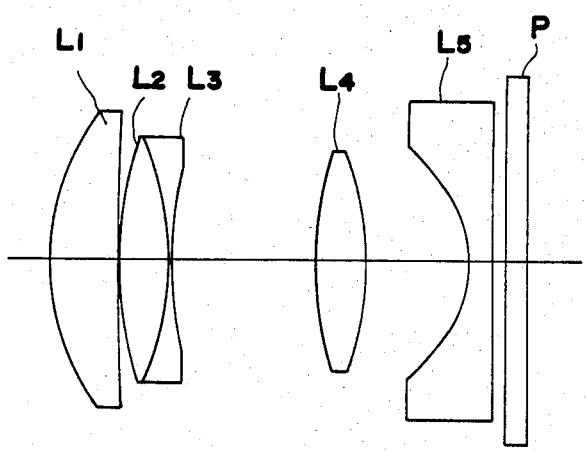
FIG. 3 represents a schematic cross sectional view of a second embodiment according to the present invention.
Figure 5:
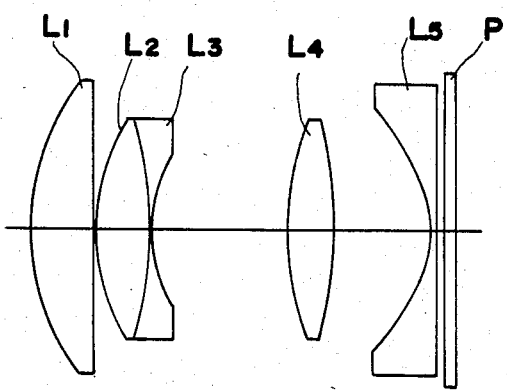
FIG. 5 represents a schematic cross sectional view of a third embodiment according to the present invention.

As is shown in FIGS. 1, 3 and 5, the present invention provides a lens system for projecting onto a screen (not shown) a video image formed on a face plate(P) of a cathode ray tube comprising, from the screen to the tube side: a first positive lens ($L_1$) having a screen side convex surface; a second positive lens ($L_2$); a third negative lens ($L_3$); a fourth biconvex lens ($L_4$); and a fifth negative lens ($L_5$) having a screen side concave surface, at least the fourth lens ($L_4$) being made of a glass material, wherein the lens system includes at least one aspheric surface and fulfills the following conditions:

(1) $1.2 < f_{123}/f < 2.5$ (2) $0.5 < f_2/|f_3| < 2$ (3) $\nu_2/\nu_3 > 1.5$ wherein: f represents a focal length of the whole lens system; $f_{123}$ represents a total focal length from the screen side surface of the first positive lens ($L_1$) to the tube side surface of the third negative lens ($L_3$); $f_2$ represents a focal length of the second positive lens ($L_2$) by itself; $f_3$ represents a focal length of the third negative lens ($L_3$) by itself; $\nu_2$ represents an Abbe number of the second positive lens ($L_2$) with respect to d-line; and $\nu_3$ represents an Abbe number of the third negative lens ($L_3$) with respect to d-line.

According to the present invention, at least one aspheric surface is adopted by utilizing at least one plastic lens element for successfully correcting aberrations, while a glass material is adopted to form at least the fourth biconvex lens ($L_4$), which bears a considerable part of the whole positive refractive power distributed in the lens system, for the purpose of reducing the temperature depending variation of the optical performance of the lens system. The glass lens element ($L_4$) is also effective to shield the X-ray radiation caused by the fluorescent surface of the cathode ray tube.

Above condition (1) is for balancing between the correction for the paraxial aberrations and that for the off-axial aberrations. If the lower limit is violated, the spherical aberration of higher degrees and negative deviation of the field curvature would be caused. On the other hand, the over-correction of the field curvature and the sagittal flare of off-axial light pencil would be caused if the upper limit of condition (1) is violated. In any case of violating the limits of condition (1), the lens system would fail to attain the desired high optical performance and the high speed due to the unbalance in correction between the paraxial and off-axial aberrations.

Conditions (2) and (3) relate to the correction of chromatic aberration according to the present invention. If any one of these conditions is violated, it would be difficult to reduce the longitudinal chromatic aberration within a tolerable range.

In accordance with the present invention, the lens system is further recommended to fulfill the following conditions:

(4) $1.2 < f_{123}/f_4 < 2.5$
(5) $0.2 < D_{45}/f < 0.5$
(6) $0.3 < f_2/f_{123} < 1$
(7) $0.2 < |f_3|/f_{123} < 1$
(8) $0.5 < f_2/f_1 < 1$
(9) $n_4 > 1.55$ wherein: $f_4$ represents a focal length of the fourth biconvex lens ($L_4$); $D_{45}$ represents the axial distance between the fourth biconvex lens ($L_4$) and the fifth negative lens ($L_5$); $f_1$ represents a focal length of the first positive lens ($L_1$) by itself; and $n_4$ represents the refractive index of the fourth biconvex lens with respect to d-line.

Condition (4), as well as condition (1), is for obtaining a lens system with high optical performance and high speed. If the lower limit of condition (4), which defines the relative positive power to be distributed to the fourth biconvex lens ($L_4$), is violated, the positive power borne by the fourth biconvex lens ($L_4$) would be relatively insufficient to result in a difficulty in correcting spherical aberration of higher degree and the negative deviation of the field curvature. On the other hand, a relatively excessive positive refractive power distributed to the fourth biconvex lens ($L_4$) capable violating the upper limit of condition (4) would make it difficult to avoid the over-correction of the field curvature and generation of the sagittal flare of an off-axial light pencil.

Condition (5) defines the relative location of the fourth biconvex lens ($L_4$). If the lower limit of condition (5) is violated, it would be difficult to correct the increased astigmatic difference and the negative deviation of the field curvature. On the other hand, if the upper limit is violated, the correction of the spherical aberration and the sagittal flare of the off-axial light pencil would be difficult.

Conditions (6) to (8) are all for obtaining a lens system with high optical performance and high speed. If any one of the lower limits of these conditions is violated, it would be difficult to increase the lens speed due to the under-correction of the spherical aberration, and it would be difficult to secure a sufficient marginal illumination due to the greatly generated coma. On the other hand, it would be difficult to correct the longitudinal chromatic aberration and to avoid the over-correction of field curvature, if any one of the upper limits of conditions (6) to (8) are violated.

Condition (9) relates to the glass lens element ($L_4$), and any practical glass material effective to sufficiently shield X-ray radiation would be difficult to be obtained if violating this condition occurs.

Further according to the present invention, it is recommended to construct the first positive lens ($L_1$) or the second positive lens ($L_2$) as a glass lens element. In this case if the first positive lens ($L_1$) is made of glass material, the lens system is recommended to further fulfill the following condition:

(10) $|f_{23}/f| > 2.5$ wherein: $f_{23}$ represents a total focal length from the screen side surface of the second positive lens to the tube side surface of the third negative lens. Or, alternatively, if the second positive lens ($L_2$) is made of a glass material, the lens system is recommended to further fulfill the following condition:

(11) $0.3 < |f_3|/f_1 < 1$.

The above construction of adopting a further glass lens element and conditions (10) and (11) relating thereto are for solving the problem of temperature depending optical performance. Generally speaking, the coefficient of variation in refractive index depending on the change in temperature for plastic material is extremely greater than that for glass material, i.e., the former is about ten to hundred times the latter. On the other hand, a negative lens element made of a material with a great dispersion (e.g., small value in terms of Abbe number) is necessary in the lens system for correcting chromatic aberration. According to the present invention, such a negative lens element is made of plastic, and its temperature depending optical performance is cancelled by another plastic lens element with a positive refractive power counterbalanced with the refractive power of the negative plastic lens element for correcting the temperature depending deviation of the image point. Further, the remaining two positive lens elements are made of glass material with a relatively temperature-free refractive index. Thus, the total lens system is of a substantially temperature-free optical performance in spite of the fact that the plastic lens elements are effectively utilized. Practically, the second positive lens ($L_2$) and the third negative lens ($L_3$) are made of plastic with their temperature dependency cancelled with each other, and the first positive lens ($L_1$) and the fourth biconvex lens ($L_4$) are made of glass to avoid further temperature dependency. Or, alternatively, the first positive lens ($L_1$) and the third biconcave lens ($L_3$) are made of plastic in a counterbalanced relation and the second biconvex lens ($L_2$) and fourth biconvex lens ($L_4$) are both made of glass materials. Conditions (10) and (11) each define the power distribution for effectively achieving the above explained temperature-free characteristic with any possible trouble in correcting aberrations avoided, in relation to the above two cases of designs utilizing plastic lens elements and glass lens elements, respectively.

Specifically, condition (10) relates to the former case of lens design and requires that the absolute value for the total refractive power of the second positive lens ($L_2$) and the third negative lens ($L_3$) should be less than a predetermined limit. This means that the second positive lens ($L_2$) made of plastic is of a positive refractive power substantially counterbalanced with the negative refractive power of the third negative lens ($L_3$) also made of plastic. If condition (10) is violated, the cancellation of the temperature dependency of the plastic lens elements would be insufficient.

On the other hand, condition (11) relates to the latter case of lens design and defines a range capable of effectively cancelling the temperature dependency between the first positive lens ($L_1$) and the third negative lens ($L_3$) both made of plastic. If condition (11) is violated, the cancellation of refractive powers of the plastic lens elements would be insufficient.

Following tables 1 to 3 show a first to third embodiment according to the present invention respectively.

TABLE 1

[Embodiment 1]

$f = 100, \beta = -0.067, F_{No} = 1.3,$
$R = \infty$ (Radius of Screen Curvative)

| | | | | | | | |
|---|---|---|---|---|---|---|---|
| $L_1$ | $r_1$ | 70.55 | $d_1$ | 19.7 | $n_1$ 1.517 | $\nu_1$ 64.1 | |
| | $r_2$ | 1926.62 | | | | | |
| | | | $d_2$ | 0.9 | | | |
| $L_2$ | $r_3*$ | 62.70 | $d_3$ | 19.6 | $n_2$ 1.491 | $\nu_2$ 57.8 | |
| | $r_4$ | −107.96 | | | | | |
| $L_3$ | | | $d_4$ | 2.9 | $n_3$ 1.592 | $\nu_3$ 30.9 | |
| | $r_5*$ | 66.41 | | | | | |
| | | | $d_5$ | 45.8 | | | |
| $L_4$ | $r_6$ | 84.99 | $d_6$ | 12.8 | $n_4$ 1.589 | $\nu_4$ 61.1 | |
| | $r_7$ | −171.71 | | | | | |
| | | | $d_7$ | 29.7 | | | |
| $L_5$ | $r_8*$ | ∞ | $d_8$ | 2.8 | $n_5$ 1.491 | $\nu_5$ 57.8 | |
| | $r_9$ | 346.16 | | | | | |
| | | | d | 3.1 | | | |
| P | $r_A$ | 368.34 | d | 4.2 | n 1.536 | $\nu$ 50.7 | |
| | $r_B$ | 304.70 | | | | | |

Aspheric surface coefficients

| | $r_3$ | $r_5$ | $r_8$ |
|---|---|---|---|
| $c_1$ | $0.19007 \times 10^{-3}$ | $0.13636 \times 10^{-2}$ | $-0.20020 \times 10^{-1}$ |
| $c_2$ | $0.88656 \times 10^{-8}$ | $0.73412 \times 10^{-6}$ | $0.93250 \times 10^{-5}$ |
| $c_3$ | $-0.99556 \times 10^{-11}$ | $0.40434 \times 10^{-9}$ | $-0.48121 \times 10^{-8}$ |
| $c_4$ | $0.62736 \times 10^{-14}$ | $-0.15449 \times 10^{-14}$ | $-0.13343 \times 10^{-11}$ |
| $c_5$ | $0.55916 \times 10^{-18}$ | $-0.43637 \times 10^{-18}$ | $0.19717 \times 10^{-14}$ |
| $c_6$ | $0.27606 \times 10^{-20}$ | $-0.17676 \times 10^{-20}$ | $0.56207 \times 10^{-18}$ |
| $c_7$ | $0.36815 \times 10^{-25}$ | $-0.68839 \times 10^{-25}$ | $-0.94610 \times 10^{-21}$ |
| $c_8$ | $-0.13897 \times 10^{-29}$ | $-0.24160 \times 10^{-29}$ | $0.23969 \times 10^{-24}$ |

TABLE 2

[Embodiment 2]

$f = 100, \beta = -0.095, F_{No} = 1.4,$
$R = 2500$ (Radius of Screen Curvature)

| | | | | | | | |
|---|---|---|---|---|---|---|---|
| $L_1$ | $r_1*$ | 71.94 | $d_1$ | 22.1 | $n_1$ 1.491 | $\nu_1$ 57.8 | |
| | $r_2$ | 913.67 | | | | | |
| | | | $d_2$ | 0.4 | | | |
| $L_2$ | $r_3$ | 147.13 | $d_3$ | 15.7 | $n_2$ 1.517 | $\nu_2$ 64.1 | |
| | $r_4$ | −111.39 | | | | | |
| $L_3$ | | | $d_4$ | 1.7 | $n_3$ 1.592 | $\nu_3$ 30.9 | |
| | $r_5*$ | 133.53 | | | | | |
| | | | $d_5$ | 49.4 | | | |
| $L_4$ | $r_6$ | 127.78 | $d_6$ | 16.9 | $n_4$ 1.620 | $\nu_4$ 60.3 | |
| | $r_7$ | −105.03 | | | | | |
| | | | $d_7$ | 34.4 | | | |
| $L_5$ | $r_8*$ | ∞ | $d_8$ | 7.8 | $n_5$ 1.491 | $\nu_5$ 57.8 | |
| | $r_9$ | ∞ | | | | | |
| | | | d | 4.4 | | | |
| P | $r_A$ | ∞ | d | 7.4 | n 1.536 | $\nu$ 50.7 | |
| | $r_B$ | ∞ | | | | | |

Aspheric surface coefficients

| | $r_1$ | $r_5$ | $r_8$ |
|---|---|---|---|
| $c_1$ | $-0.49052 \times 10^{-3}$ | $-0.85295 \times 10^{-3}$ | $-0.16206 \times 10^{-1}$ |
| $c_2$ | $0.55857 \times 10^{-8}$ | $0.51306 \times 10^{-6}$ | $0.44220 \times 10^{-5}$ |
| $c_3$ | $-0.11096 \times 10^{-9}$ | $0.13733 \times 10^{-9}$ | $-0.49479 \times 10^{-8}$ |
| $c_4$ | $0.11280 \times 10^{-12}$ | $0.60360 \times 10^{-13}$ | $0.26413 \times 10^{-11}$ |
| $c_5$ | $-0.35719 \times 10^{-16}$ | $0.17785 \times 10^{-16}$ | $-0.43366 \times 10^{-15}$ |
| $c_6$ | $-0.76187 \times 10^{-21}$ | $0.26510 \times 10^{-19}$ | $-0.54912 \times 10^{-20}$ |
| $c_7$ | $0.45666 \times 10^{-23}$ | $0.10451 \times 10^{-23}$ | $0.96807 \times 10^{-24}$ |
| $c_8$ | $-0.86948 \times 10^{-27}$ | $0.35720 \times 10^{-27}$ | $-0.62585 \times 10^{-26}$ |

TABLE 3

[Embodiment 3]

$f = 100, \beta = -0.067, F_{No} = 1.3,$
$R = \infty$ (Radius of Screen Curvature)

| | | | | | | | |
|---|---|---|---|---|---|---|---|
| $L_1$ | $r_1$ | 71.71 | $d_1$ | 21.7 | $n_1$ 1.589 | $\nu_1$ 61.1 | |
| | $r_2$ | ∞ | | | | | |
| | | | $d_2$ | 0.1 | | | |
| $L_2$ | $r_3*$ | 71.67 | $d_3$ | 18.1 | $n_2$ 1.491 | $\nu_2$ 57.8 | |
| | $r_4$ | −131.27 | | | | | |
| $L_3$ | | | $d_4$ | 1.8 | $n_3$ 1.592 | $\nu_3$ 30.9 | |
| | $r_5*$ | 74.64 | | | | | |
| | | | $d_5$ | 45.7 | | | |
| $L_4$ | $r_6$ | 97.55 | $d_6$ | 15.8 | $n_4$ 1.589 | $\nu_4$ 61.1 | |
| | $r_7$ | −135.00 | | | | | |
| | | | $d_7$ | 32.4 | | | |
| $L_5$ | $r_8*$ | ∞ | $d_8$ | 1.9 | $n_5$ 1.491 | $\nu_5$ 57.8 | |
| | $r_9$ | ∞ | | | | | |
| | | | d | 3.1 | | | |
| P | $r_A$ | ∞ | d | 4.2 | n 1.536 | $\nu$ 50.7 | |
| | $r_B$ | ∞ | | | | | |

Aspheric surface coefficients

| | $r_3$ | $r_5$ | $r_8$ |
|---|---|---|---|
| $c_1$ | $-0.37574 \times 10^{-3}$ | $0.20962 \times 10^{-2}$ | $-0.17554 \times 10^{-1}$ |
| $c_2$ | $-0.29758 \times 10^{-6}$ | $0.57590 \times 10^{-6}$ | $0.85381 \times 10^{-5}$ |
| $c_3$ | $-0.14928 \times 10^{-9}$ | $0.10025 \times 10^{-9}$ | $-0.47541 \times 10^{-8}$ |
| $c_4$ | $-0.24235 \times 10^{-13}$ | $0.14617 \times 10^{-13}$ | $-0.14242 \times 10^{-11}$ |
| $c_5$ | $-0.35727 \times 10^{-18}$ | $-0.31816 \times 10^{-18}$ | $0.18952 \times 10^{-14}$ |
| $c_6$ | $-0.98531 \times 10^{-21}$ | $-0.16320 \times 10^{-20}$ | $0.45919 \times 10^{-18}$ |
| $c_7$ | $0.29617 \times 10^{-25}$ | $-0.36318 \times 10^{-23}$ | $-0.70795 \times 10^{-21}$ |
| $c_8$ | $-0.16784 \times 10^{-29}$ | $0.51274 \times 10^{-28}$ | $0.14766 \times 10^{-24}$ |

In Tables 1 to 3, radii of curvature, $r_1, r_2 \ldots$; axial distances, $d_1, d_2 \ldots$; refractive indices for light of d-line (with a wavelength, 587.6 nm), $n_1, n_2 \ldots$; and Abbe number for light of d-line, $\nu_1, \nu_2 \ldots$ are numbered from screen to tube side. Further, the radius of curvature with asterisk (*) means that the corresponding surface is an aspheric surface defined by the following formula:

$$X = \frac{C_0 Y^2}{1 + (1 - C_0^2 Y^2)^{\frac{1}{2}}} + \sum_{i=1}^{8} C_i Y^{2i}$$

wherein: X represents the coordinate along the optical axis measured from the top of the aspheric surface toward the tube side; Y represents the coordinate perpendicular to the optical axis measured from the optical axis (height from the optical axis); $C_0$ represents the curvature of the basic spherical surface of radius of curvature $r$ ($C_0 = 1/r$) of the aspheric surface; and $C_i$ represents the aspheric surface coefficient. The lower part of Tables 1 to 3 summarizes the values for aspheric surface coefficients with respect to aspheric surfaces in each Example. (Radius of curvature of the aspheric surface in the paraxial region is equal to $C_0 + 2C_1$.)

Figure 2A:
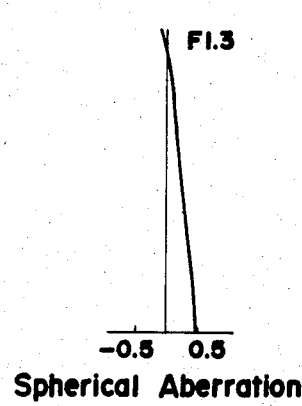
FIGS. 2a and 2b represent graphic plots of aberration curves of the first embodiment.
Figure 2B:
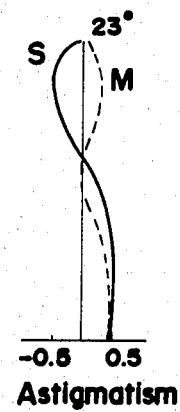
Figure 4A:
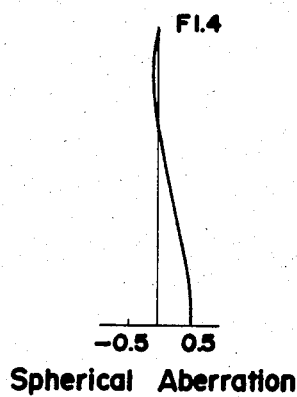
FIGS. 4a and 4b represent graphic plots of aberration curves of the second embodiment.
Figure 4B:
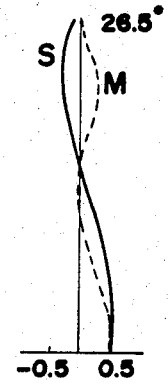
Figure 6A:
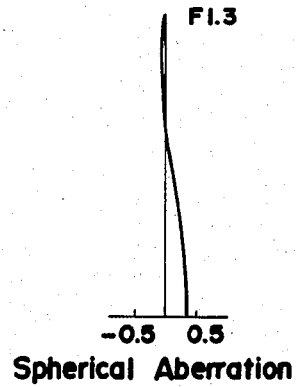
FIGS. 6a and 6b represent graphic plots of aberration curves of the third embodiment.
Figure 6B:
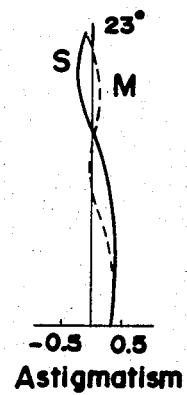

FIGS. 1, 3 and 5 represents the cross sectional views of the first to third embodiments, respectively. In these Figures and the above tables, P represents the face plate of the cathode ray tube, the surface ($r_B$) corresponding to the fluorescent surface thereof. FIGS. 2, 4 and 6 represents the aberration curves of the first to third embodiments, respectively. As in the embodiments, the second positive lens $L_2$ is recommended to be a biconvex lens and the third negative lens ($L_3$) is recommended to be a biconcave lens.

In the above embodiments, the first and third embodiments each adopt glass lens elements as the first positive lens ($L_1$) and fourth biconvex lens ($L_4$), and plastic lens elements as the remaining lenses ($L_2$, $L_3$ and $L_5$), while the second embodiment adopts glass lens elements as the second positive lens ($L_2$) and fourth biconvex lens ($L_4$), and plastic lens elements as the remaining lenses ($L_1$, $L_3$ and $L_5$).

Although the second positive lens ($L_2$) is cemented to the third negative lens ($L_3$) in all of the embodiments, it should be noted that these lenses can be separated from each other with an air space formed therebetween. And such a modification is also within the scope of the present invention. Further, in all the embodiments, the lenses made of glass each consist of a spherical single glass lens element. Such a modification is, however, further possible in that the glass lens element can be modified into a composite aspheric glass lens element consisting of a base spherical glass lens element and a thin transparent resin layer coated or stuck on the base spherical glass lens element with its air side surface made aspheric. Such a composite aspheric glass lens element can be utilized as the fourth biconvex lens ($L_4$) of the present invention, for example. In this specification the words, "a glass lens element" or "a lens made of glass" should be read not only on a single glass lens element, but also on such a composite aspheric glass lens element.

While the parameters of the present invention can be found in the above examples, the examples should not be considered limiting but rather illustrative of the advantages of the present invention. Accordingly, the parameters of the present invention should be measured solely from the following claims.

What is claimed is:

1. A lens system for projecting onto a screen a video image formed on a face plate of a cathode ray tube comprising, from the screen to the tube side:
  a first positive lens having a screen side convex surface;
  a second positive lens;
  a third negative lens;
  a fourth biconvex lens; and
  a fifth negative lens having a screen side concave surface, at least the fourth lens being made of a glass material, wherein the lens system includes at least one aspheric surface and fulfills the following conditions:
  $1.2 < f_{123}/f < 2.5$
  $0.5 < f_2/|f_3| < 2$
  $\nu_2/\nu_3 > 1.5$
  wherein:
    f represents a focal length of the whole lens system;
    $f_{123}$ represents a total focal length from the screen side surface of the first positive lens to the tube side surface of the third negative lens;
    $f_2$ represents a focal length of the second positive lens by itself;
    $f_3$ represents a focal length of the third negative lens by itself;
    $\nu_2$ represents an Abbe number of the second positive lens with respect to d-line; and
    $\nu_3$ represents an Abbe number of the third negative lens with respect to d-line.

2. The invention of claim 1, wherein the lens system further fulfills the following condition:
  $1.2 < f_{123}/f_4 < 2.5$
  wherein:
    $f_4$ represents a focal length of the fourth biconvex lens.

3. The invention of claim 1, wherein the lens system further fulfills the following condition:
  $0.2 < D_{45}/f < 0.5$
  wherein:
    $D_{45}$ represents the axial distance between the fourth biconvex lens and the fifth negative lens.

4. The invention of claim 1, wherein the lens system further fulfills the following conditions:
  $0.3 < f_2/f_{123} < 1$
  $0.2 < |f_3|/f_{123} < 1$.

5. The invention of claim 1, wherein the lens system further fulfills the following condition:
  $0.5 < f_2/f_1 < 1$
  wherein:
    $f_1$ represent a focal length of the first positive lens by itself.

6. The invention of claim 1, wherein the lens system further fulfills the following condition:
  $n_4 > 1.55$
  wherein:
    $n_4$ represents the refractive index of the fourth biconvex lens with respect to d-line.

7. The invention of claim 1, wherein the first positive lens is made of glass material, and wherein the lens system further fulfills the following condition:
  $|f_{23}/f| > 2.5$
  wherein:
    $f_{23}$ represents a total focal length from the screen side surface of the second positive lens to the tube side surface of the third negative lens.

8. The invention of claim 1, wherein the second positive lens is made of a glass material, and wherein the lens system further fulfills the following condition:
  $0.3 < |f_3|/f_1 < 1$
  wherein:
    $f_1$ represents the focal length of the first positive lens by itself.

9. The invention of claim 1, wherein the third negative lens is made of a plastic material.

10. The invention of claim 9, wherein the second positive lens is made of a plastic material.

11. The invention of claim 10, wherein the first positive lens is made of a glass material.

12. The invention of claim 11, wherein the fifth negative lens is made of a plastic material.

13. The invention of claim 9, wherein the first positive lens is made of a plastic material.

14. The invention of claim 13, wherein the second positive lens is made of a glass material.

15. The invention of claim 14, wherein the fifth negative lens is made of a plastic material.

16. The invention of claim 1, wherein the second positive lens is biconvex and the third negative lens is biconcave.

17. The invention of claim 9 wherein one of the first and second lenses is made of a glass material, and the other of a plastic material.

18. The invention of claim 17, wherein the fifth negative lens is made of a plastic material.

19. The invention of claim 12, wherein the lens system fulfills the following condition:

$|f_{23}/f| > 2.5$ wherein:

$f_{23}$ represents a total focal length from the screen side surface of the second positive lens to the tube side surface of the third negative lens.

20. The invention of claim 15, wherein the lens system fulfills the following condition:

$0.3 < |f_3|/f_1 < 1$ wherein:

$f_1$ represents the focal length of the first positive lens by itself.

21. A lens system for projecting onto a screen a video image formed on a face plate of a cathode ray tube wherein L represents the lens element and P represents the face plate of a cathode ray tube comprising the following design parameters, wherein asterisk (*) represents the aspheric surface with the following aspheric coefficients Ci:

| | | | | | | |
|---|---|---|---|---|---|---|
| $f = 100, \beta = -0.067, F_{No} = 1.3, R = \infty$ ||||||||
| | $r_1$ | 70.55 | | | | |
| $L_1$ | | | $d_1$ 19.7 | $n_1$ 1.517 | $\nu_1$ 64.1 |
| | $r_2$ | 1926.62 | | | | |
| | | | $d_2$ 0.9 | | | |
| $L_2$ | $r_3$* | 62.70 | | | | |
| | | | $d_3$ 19.6 | $n_2$ 1.491 | $\nu_2$ 57.8 |
| | $r_4$ | −107.96 | | | | |
| $L_3$ | | | $d_4$ 2.9 | $n_3$ 1.592 | $\nu_3$ 30.9 |
| | $r_5$* | 66.41 | | | | |
| | | | $d_5$ 45.8 | | | |
| $L_4$ | $r_6$ | 84.99 | | | | |
| | | | $d_6$ 12.8 | $n_4$ 1.589 | $\nu_4$ 61.1 |
| | $r_7$ | −171.71 | | | | |
| | | | $d_7$ 29.7 | | | |
| $L_5$ | $r_8$* | $\infty$ | | | | |
| | | | $d_8$ 2.8 | $n_5$ 1.491 | $\nu_5$ 57.8 |
| | $r_9$ | 346.16 | | | | |
| | | | $d$ 3.1 | | | |
| P | $r_A$ | 368.34 | | | | |
| | | | $d$ 4.2 | $n$ 1.536 | $\nu$ 50.7 |
| | $r_B$ | 304.70 | | | | |

Aspheric surface coefficients

| | $r_3$ | $r_5$ | $r_8$ |
|---|---|---|---|
| $c_1$ | $0.19007 \times 10^{-3}$ | $0.13636 \times 10^{-2}$ | $-0.20020 \times 10^{-1}$ |
| $c_2$ | $0.88656 \times 10^{-8}$ | $0.73412 \times 10^{-6}$ | $0.93250 \times 10^{-5}$ |
| $c_3$ | $-0.99556 \times 10^{-11}$ | $0.40434 \times 10^{-9}$ | $-0.48121 \times 10^{-8}$ |
| $c_4$ | $0.62736 \times 10^{-14}$ | $-0.15449 \times 10^{-14}$ | $-0.13343 \times 10^{-11}$ |
| $c_5$ | $0.55916 \times 10^{-18}$ | $-0.43637 \times 10^{-18}$ | $0.19717 \times 10^{-14}$ |
| $c_6$ | $0.27606 \times 10^{-20}$ | $-0.17676 \times 10^{-20}$ | $0.56207 \times 10^{-18}$ |
| $c_7$ | $0.36815 \times 10^{-25}$ | $-0.68839 \times 10^{-25}$ | $-0.94610 \times 10^{-21}$ |
| $c_8$ | $-0.13897 \times 10^{-29}$ | $-0.24160 \times 10^{-29}$ | $0.23969 \times 10^{-24}$ |

* * * * *